Jan. 16, 1934.  C. H. WHITE  1,943,778
TRACTOR PLANTER
Filed Sept. 19, 1927  7 Sheets-Sheet 1
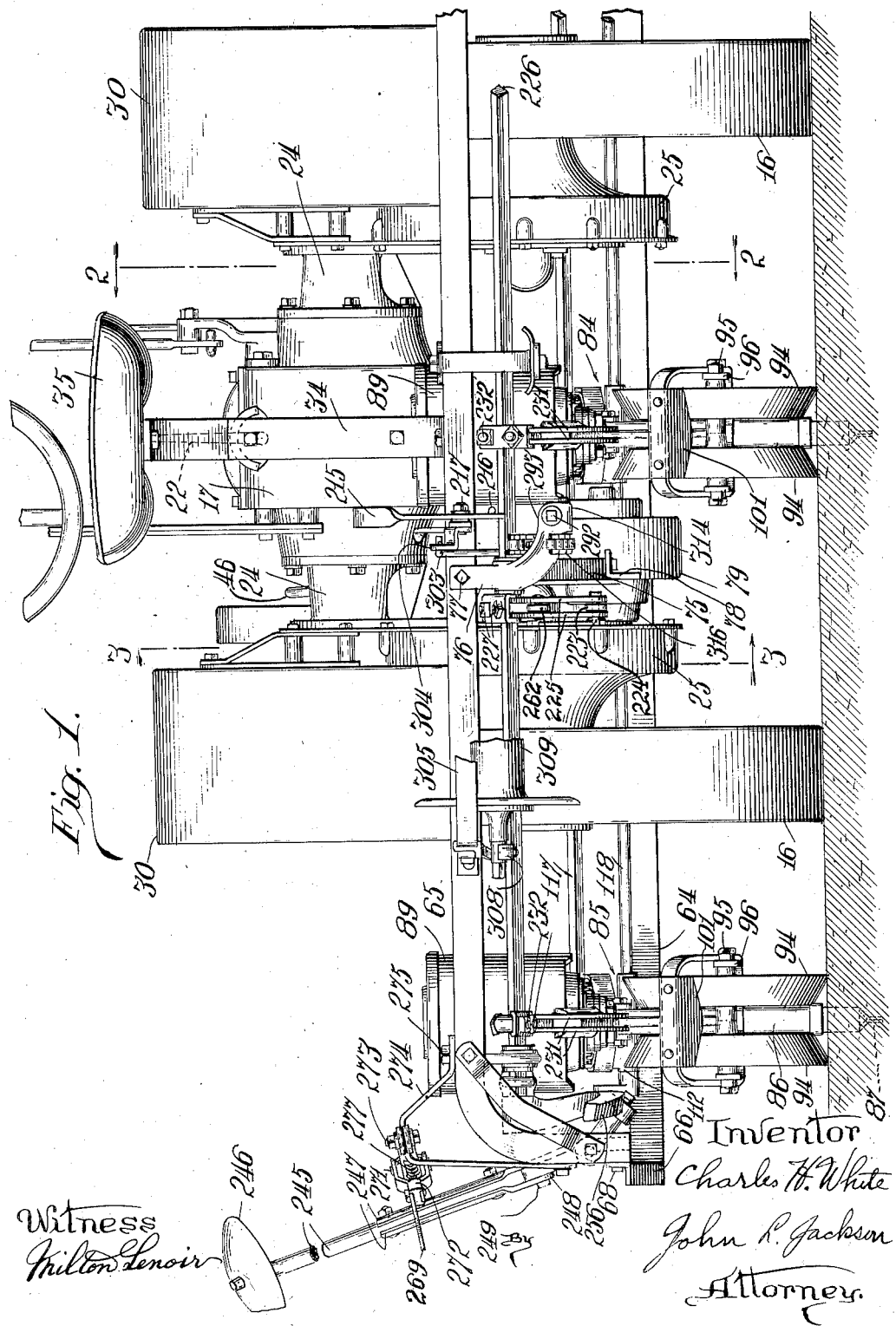

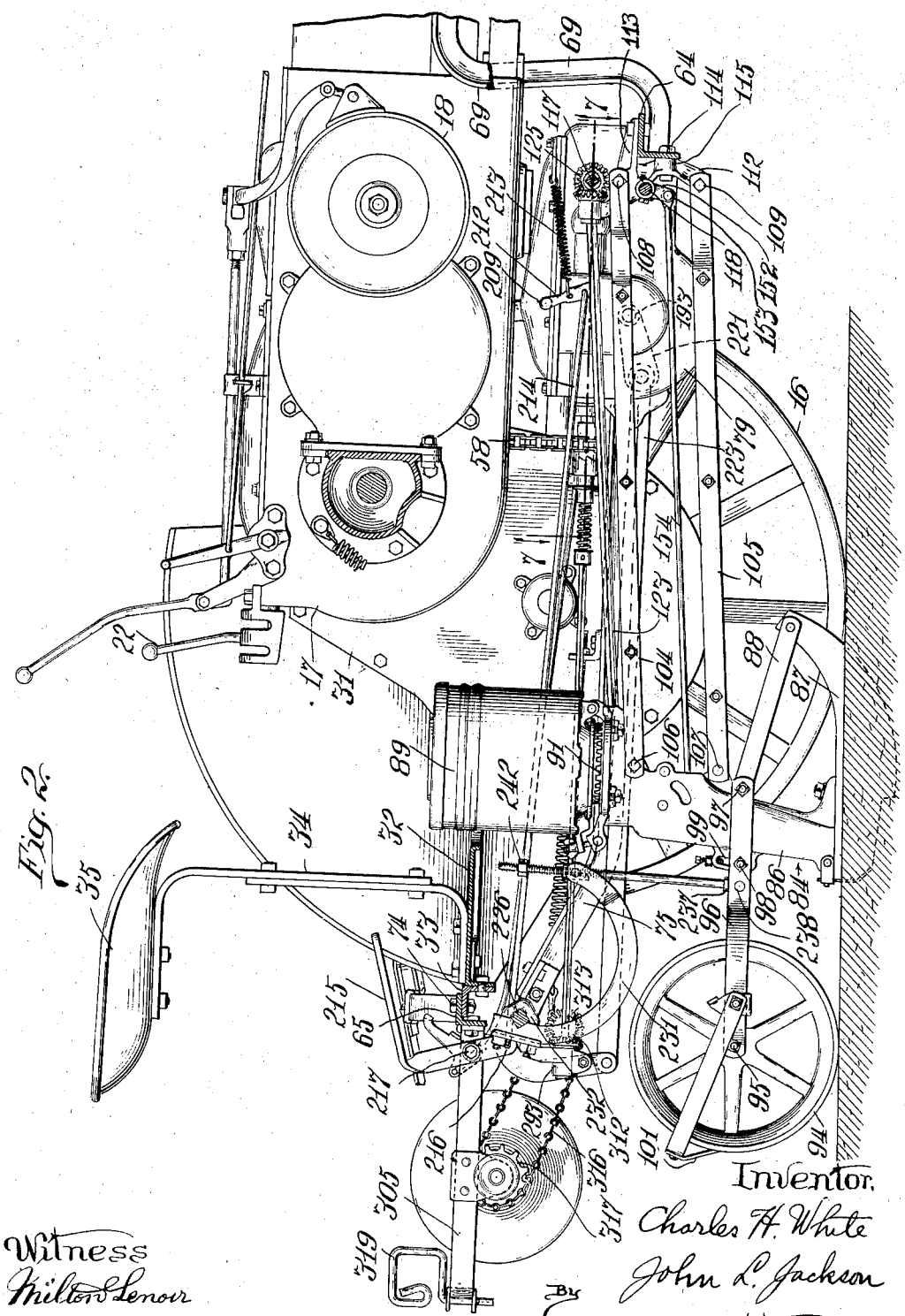

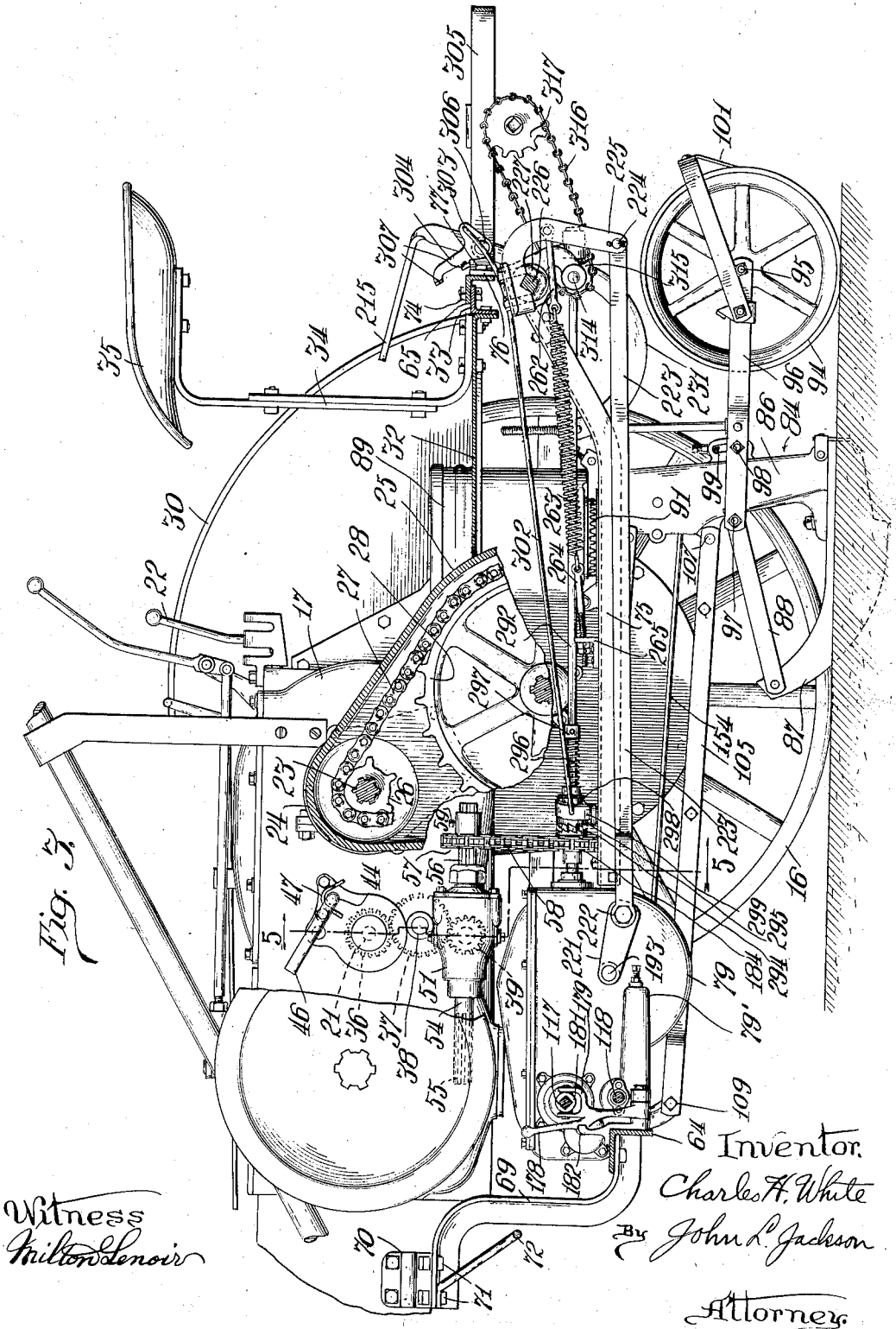

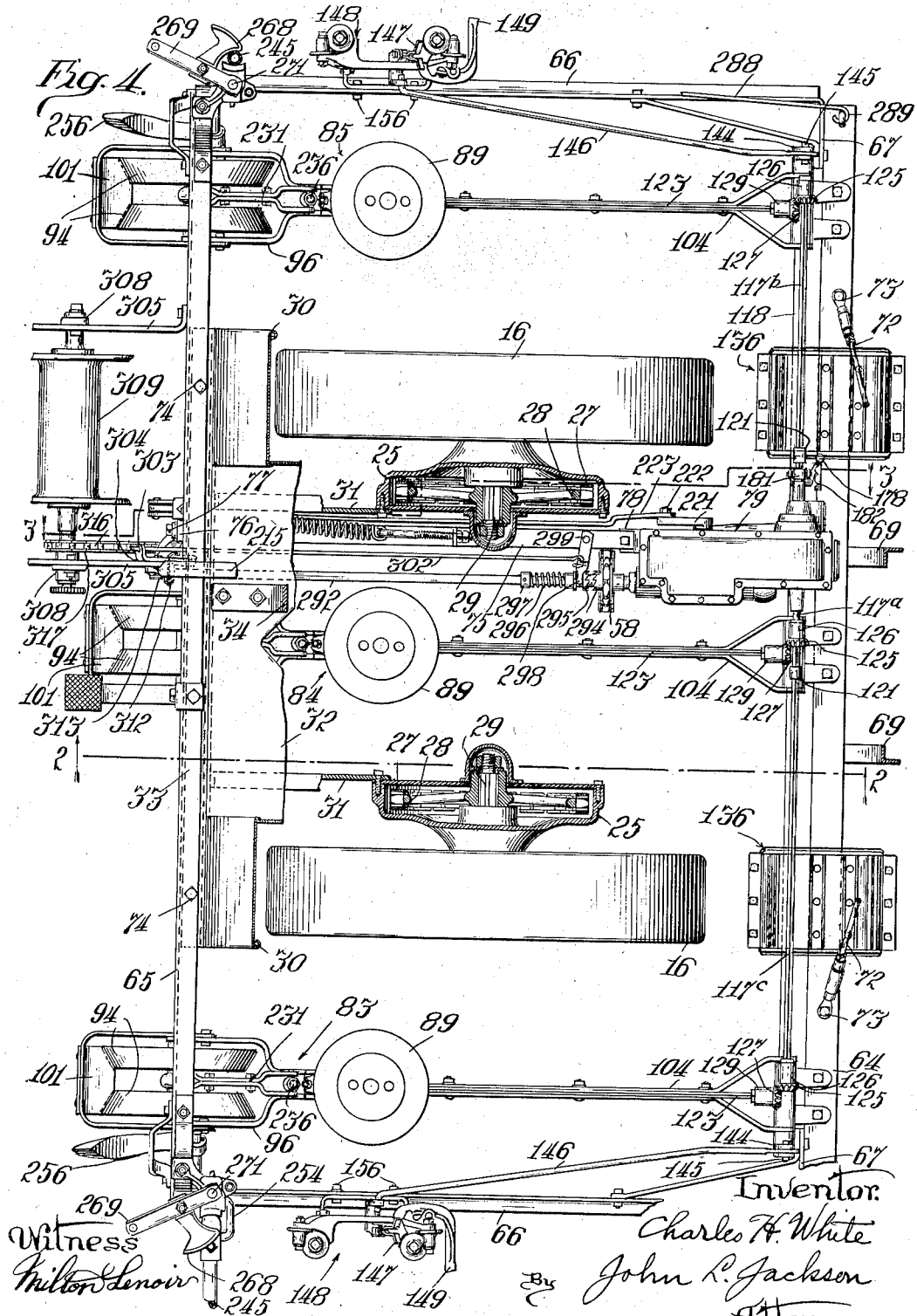

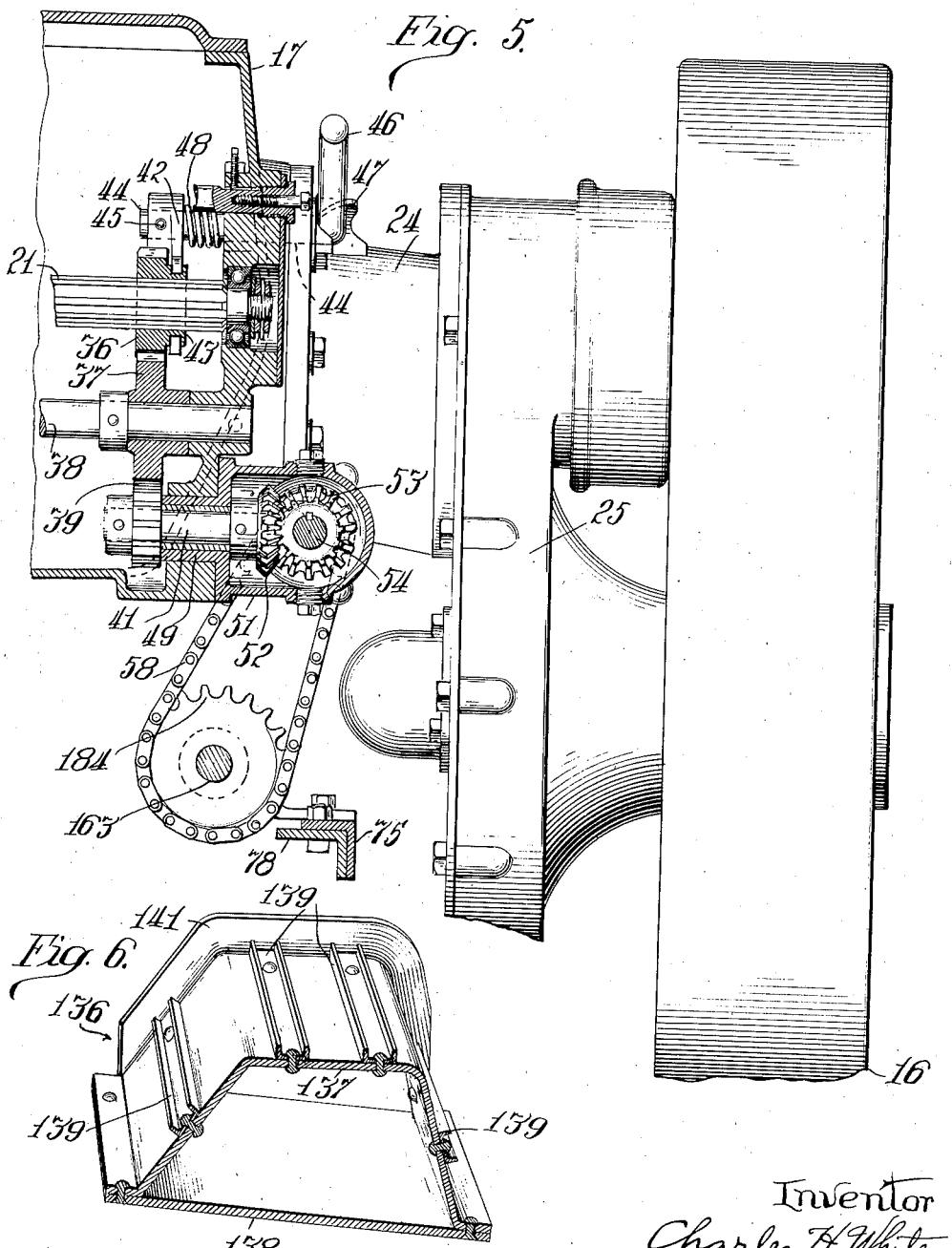

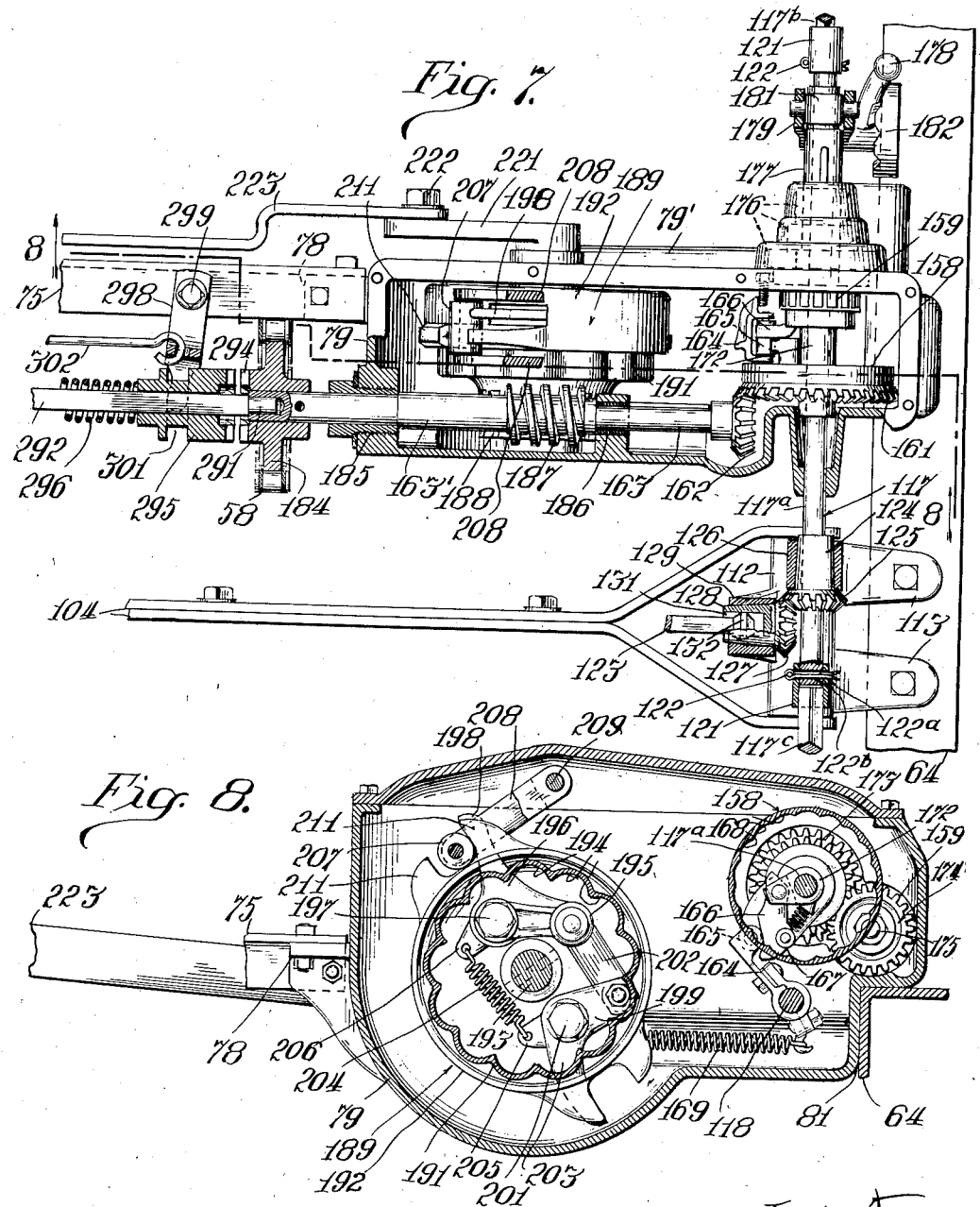

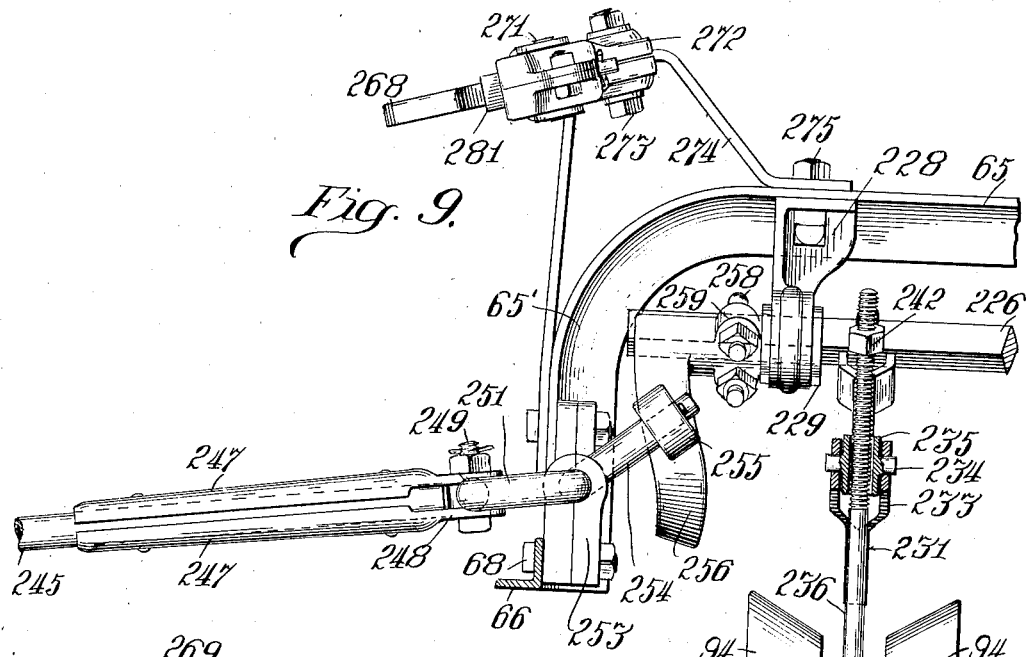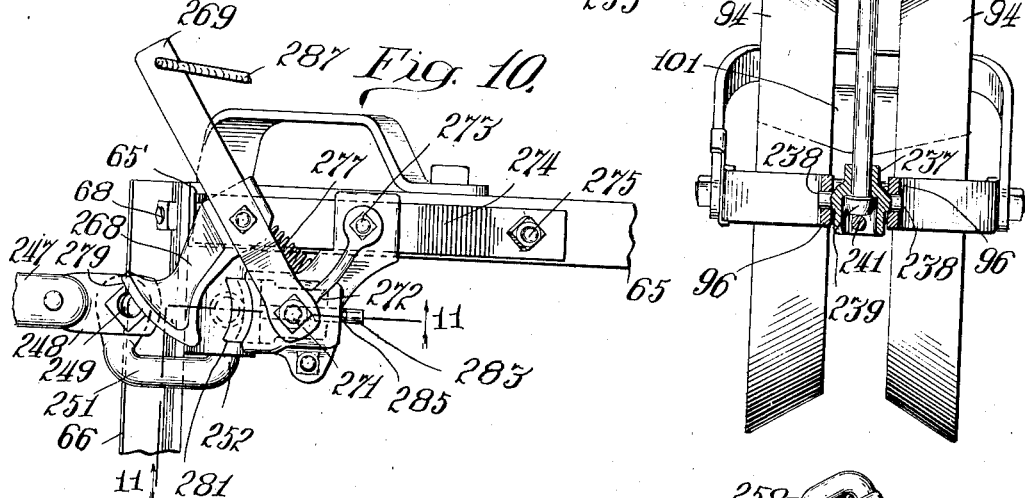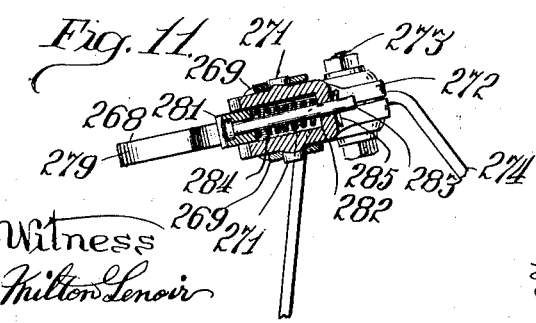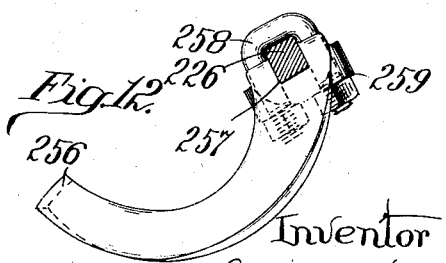

Patented Jan. 16, 1934

1,943,778

UNITED STATES PATENT OFFICE 1,943,778

TRACTOR PLANTER

Charles H. White, Moline, Ill., assignor to Deere & Company, Moline, Ill., a corporation of Illinois Application September 19, 1927
Serial No. 220,472

47 Claims. (Cl. 111—52)

The present invention relates to planting implements of the motor-driven or tractor-propelled type.

One of the principal objects of the invention is to provide a planting implement which is in the nature of an attachment, adapted for direct mounting in its entirety on a tractor, so that the wheels of the tractor serve as the load sustaining and steering members for the combined tractor and planter.

Another object of the invention, made practicable by the foregoing construction, is to place the planter units or their furrow openers in immediate proximity to the tractor drive wheels. I have found that when the planter units are disposed considerably in rear of the tractor, difficulty is had in planting straight rows because any slight deviation of the tractor to one side or the other will result in considerable side swing of the planter units. According to the present construction, such is avoided by locating the planter units in the transverse plane of the rear tractor wheels, substantially in the vertical axial plane thereof. Thus, in any angular deviation of the tractor, the planter units are only turned through the very slight angular movement of the rear wheel axis, instead of being swung through a wide arc in rear of the tractor.

Another object of the invention, also made possible by the foregoing construction, is to shorten the over-all length of the combined tractor and planter, so as to reduce the turning room required at the ends of the field. According to the present construction, the over-all length of the tractor and planter combined is only slightly longer than the over-all length of the tractor.

Another object of the invention is to utilize the power of the tractor to lift the planter units and the marker arms at the ends of the field. To realize to the utmost the advantages of motor driven practice, it is desirable that all of the operations attendant to the tractor and to the implement be capable of being performed by one man, quickly and easily. The operation of manually lifting the three or more planter units and one of the marker arms at each end of the field is burdensome, and usually requires stopping of the tractor to perform these operations before the turn can be made. I have avoided such objections in the present construction by providing an improvement form of power lift mechanism which derives its operating energy from a power take-off device on the tractor, and which is made operative, through a simple control movement on the part of the operator, to raise all of the planter units, as well as the then engaging marker arm, to their inoperative positions clear of the ground. By virtue of this arrangement, the operator can devote all of his attention to steering the tractor as he approaches the end of the field, and there is no necessity of stopping the tractor to raise the planter units and marker. After the implement has been turned around, the planter units can be returned to operative position by the simple actuation of this control member, and the appropriate marker arm can be dropped by the tripping of certain latch mechanism associated therewith. As will hereinafter appear in the detailed portion of the specification, I have also utilized the engine power of the tractor for driving the seed feeding plates of the planter units; and have provided improved means for driving the check-wire reel by engine power, such being employed when it is desired to wind the wire upon the reel.

Another object of the invention is to provide a planting attachment of the above general description which can be attached to or detached from the tractor in a short length of time. It frequently happens that in order to take advantage of weather and soil conditions, it is desirable to alternate the operations of plowing, harrowing and planting in the same field or in different fields, and it is hence of great importance to be able to interchange implements in a short length of time. The present machine is so constructed that the planting implement can be attached to and detached from the tractor through the quick and easy connection and disconnection of only a few parts; and one of the features by which the tractor and planting implement can be readily connected and disconnected is a particular construction and arrangement of the planter implement parts whereby the tractor wheels can be driven over one end of the implement frame in the attaching and detaching operations.

Numerous other objects of the invention pertaining to the more specific features of construction will be set forth in the following description of a preferred embodiment of the invention.

In the drawings illustrating such embodiment:

Fig. 1 is a fragmentary rear elevational view of the motor planter.

Fig. 2 is a longitudinal sectional view through the tractor and the planting implement, corresponding approximately to a section taken on the planes of the lines 2—2 of Figs. 1 and 4.

Fig. 3 is a similar sectional view from the opposite side of the machine, corresponding to a sectional view taken approximately on the planes of the lines 3—3 of Figs. 1 and 4.

Fig. 4 is a plan view of the planting implement, the rear driving wheels of the tractor also being shown to illustrate the relative locations of the planter units with respect to these driving wheels.

Fig. 5 is a sectional view illustrating the power take-off drive, corresponding to a section taken on the plane of the line 5—5 of Fig. 3.

Fig. 6 is a perspective view in section, illustrating one of the ramps or bridge members which are carried on the front of the implement frame.

Fig. 7 is a horizontal sectional view through the housing which encloses the power lift clutch, corresponding to a section taken approximately on the plane of the line 7—7 of Fig. 2.

Fig. 8 is a vertical sectional view through this same housing, taken on the plane of the line 8—8 of Fig. 7.

Fig. 9 is a vertical sectional view adjacent to one of the rear corners of the implement frame, illustrating the power lift connections through which the planter units and marker arms are raised to their inoperative positions.

Fig. 10 is a plan view illustrating the latch for holding each marker arm in its raised position.

Fig. 11 is a detailed sectional view taken approximately on the plane of the line 11—11 of Fig. 10, illustrating the spring pressed cushion block, and Fig. 12 is a side view of one of the curved cams which transmit lifting movement to the marker arms.

Figs. 1, 2 and 3 illustrate the general construction of the rear portion of the tractor, and Fig. 4 best illustrates the general construction of the implement frame, and the location of the planter units with respect to the tractor drive wheels when the planting implement is mounted on the tractor. I shall first describe such structural features of the tractor as have cooperation with the planting implement, and shall then describe the detailed construction of the planting implement. The tractor is of a type which is propelled by two rear drive wheels, the latter being designated 16—16. The front end of the tractor is supported on two steering wheels, not shown, which are preferably disposed in the longitudinal planes of the tractor wheels 16. The engine is at the forward portion of the tractor, and its power is transmitted to the drive wheels through a driving train, with which a power take-off device has operative connection, as will presently appear. The engine crank shaft, the selective speed transmission mechanism and the differential are inclosed in an elongated housing 17 which constitutes the rear portion of the tractor frame. The details of the transmission mechanism and the differential form no part of the present invention. For the purposes of the present description, it will suffice to say that the crank shaft is coincident with the axis of a belt pulley 18 which is located on the right hand side of the housing 17, as shown in Fig. 2. Inclosed within this belt pulley is a suitable clutch which serves to interrupt the transmission of power back to the driving wheels 16. This clutch also interrupts the transmission of power to the power take-off device.

From the driven element of such clutch, the engine power is transmitted to a splined shaft 21 (Fig. 5) which extends transversely of the housing 17 and has bearing support in the side walls thereof. Mounted for sliding movement on this shaft are a plurality of speed selection gears which are adapted to mesh selectively with different sized gears mounted on the differential. The control lever through which these speed selections are made is indicated at 22. Extending laterally from each side of the differential are suitable shafts 23, (Fig. 3) which project outwardly through the side walls of the housing and extend through short lateral housings 24 which are bolted to the sides of the main housing. Bolted to the outer ends of these lateral housings are housings 25, which extend downwardly and slightly rearwardly from the axis of the differential shafts 23. The latter housings 25 support the rear driving wheels 16 and also enclose the driving chains through which propelling power is transmitted to these rear wheels. As best shown in Fig. 3, the outer portion of each differential shaft 23 has a sprocket wheel 26 mounted thereon over which passes a sprocket chain 27. The chain passes down around a relatively large sprocket wheel 28 which has driving connection with the adjacent rear wheel. As best shown in Fig. 4, each rear wheel 16 is mounted on an individual shaft 29 which is journaled in the wheel-supporting housing 25. The large sprocket wheel 28 is suitably splined or keyed to the shaft 29. It will be observed that by virtue of the foregoing construction, there is no through axle or axle housing extending between the wheels, thus leaving this space unobstructed for the mounting of a planter unit therein, as will be presently described. It should also be noted (Fig. 2) that the rear end of the main housing 17 is disposed above the axis of the wheels, thus adding to the available space in which this intermediate planter unit can be mounted.

The upper rearward sides of the traction wheels 16 have fenders 30 extending over the same, which fenders are suitably supported on bars 31 extending rearwardly from the wheel-supporting housings 25 (Fig. 4). A platform 32 extends between the fenders 30, the rear ends of the fenders and of the platform being reinforced by a transverse angle bar 33 which is secured to both. The forward portion of the platform 32 is cut away or left open to accommodate the seed hopper on the intermediate planter unit (Fig. 2). A standard 34 rises from the platform 32 and supports the operator's seat 35.

I shall now describe the mechanism through which a power take-off drive is transmitted from the tractor to the implement. Referring to Figs. 3 and 5, particularly the latter, it will be seen that the splined shaft 21 has a small gear 36 slidably mounted thereon, adjacent to one side of the housing 17. This gear meshes an idler gear 37 mounted on a lower shaft 38, and the idler gear in turn meshes with a gear 39 secured to a shaft 41 which projects outwardly through the side of the housing 17. The shiftable gear 36 is adapted to be moved into and out of mesh with the idler gear 37 through a shifting fork 42 which engages with a grooved collar 43 formed on one side of the gear 36. The hub of the fork 42 is mounted on a shifter rod 44 which extends outwardly through the side of the housing 17.

The operative connection between the fork 42 and rod 44 is through a pin 45 which engages in a groove in the shifter rod, whereby the rod revolves within the hub of the shifter fork, but longitudinal movement of the rod compels corresponding movement of the fork. A compression spring 48 is confined between the shifting fork 42 and the adjacent wall of the housing 17. The outer end of the rod 44 is formed with a handle portion 46 which bears against the edge of a sloping cam plate 47, so that in the oscillation of the handle 46 the shifter rod 44 will be caused to move inwardly and outwardly to bring the gear 36 out of and into mesh with the idler gear 37. The cam plate 47 is provided with notches or depressions for holding the handle 46 in each of its two positions.

Referring again to the shaft 41, it will be noted that this shaft is journaled in a bearing boss 49 which is formed as a part of an outer housing 51, with the boss 49 extending through the side wall of the main housing 17. A bevel gear 52 is secured to the outer end of the shaft 41 and meshes with another bevel gear 53 secured to a longitudinally extending shaft 54. Referring to Fig. 3, the shaft 54 projects from opposite ends of the housing 51, having suitable bearing support in the ends thereof. The front end 55 of the shaft 54 is splined for making operative connection with power actuated devices at the front end of the tractor. As illustrative of the latter, I wish to remark that the present tractor has been designed to serve the manifold utility of a propelling unit for a series of agricultural implements of different types, and such forwardly extending end 55 of the power take-off shaft serves to transmit power to any of these implements which may be mounted on the front end of the tractor, represented for example by a cultivator attachment having power lift mechanism for raising the cultivator rigs. The rearwardly extending end 56 of the power take-off shaft is also splined for receiving a sprocket wheel 57 over which passes a sprocket chain 58 extending down to the power lift mechanism and seed valve driving mechanism of the present planter attachment. The sprocket wheel 57 can be shifted to any desired point along the rear end 56 of the shaft 54 for obtaining proper alinement of the chain 58 and can then be secured in its selected position by a set screw 59.

I shall now describe the construction of the planting implement, including the manner in which it is mounted on the tractor and the mechanism through which the power derived from the power take-off 54 is utilized to raise the planter units and the marker arms. Referring to Fig. 4, all of the parts of the planting implement are mounted on an open rectangular frame, the long dimension of which extends transversely of the tractor. Such frame comprises a transverse front bar 64, a transverse rear bar 65, and longitudinal side bars 66—66. All of these bars are preferably of angle section, and the front ends of the side bars are secured to the cross bar 64 by bending the vertical flanges of the side bars inwardly and securing the same to the vertical flange of the cross-bar 64, as indicated at 67. The rear bar 65 is disposed in a considerably higher plane than the side bar 66, and in joining such bars together the ends of the rear bar are curved downwardly and bolted to the vertical flanges of the side bars, as indicated at 68 in Fig. 1. The implement frame is fixedly secured at its front and rear ends to the tractor.

For mounting the front end of the frame on the tractor, two hanger brackets or arms 69 are secured to the front bar 64 of the frame and are bent upwardly and forwardly (Figs. 2 and 3) for resting on brackets 70 which project from each side of the engine bed or tractor frame. The hanger arms 69 are secured to the brackets 70 by bolts 71, the arms affording a readily attachable and detachable connection whereby the front end of the implement frame can be easily and quickly connected to or disconnected from the tractor. Extending diagonally between the front ends of the hanger arms 69 and the front cross bar 64 of the frame are brace rods 72. The front ends of such rods are secured to the hanger arms by the bolts 71 and the rear ends of the rods are secured to the frame bar by bolts 73. The rear portion of the implement frame is carried on the angle bar 33 which braces the rear ends of the fenders 30 and platform 32. It will be noted from Figs. 2 and 3 that the horizontal flange of the rear frame bar 65 extends forwardly, and in the operation of mounting the implement on the tractor this flange is brought to rest on the horizontal flange of the bar 33, the two flanges being detachably connected together by bolts 74. It will be seen from the foregoing that when the implement is connected to the tractor, it is carried thereon in its entirety. It will also be noted that the front frame bar 64 is disposed in front of the tractor drive wheels and the rear frame bar 65 is disposed in rear of said drive wheels, so that the rectangular outline of the frame encompasses the drive wheels. When it is desired to disconnect the implement frame from the tractor, the bolts 71 and 74 are removed, the brace rods 72 are swung out to the sides of the frame, and the front frame bar 64 is dropped down into proximity to the ground. Thereupon, the tractor wheels can be driven out of the frame across the front frame bar 64. The complete detachment of the implement also requires the disconnection and removal of certain other operating parts, which will be hereinafter described. In a later part of this description, I shall also describe the bridge members or ramps, which extend across the front frame bar 64, and over which the tractor wheels are driven in attaching and detaching the implement.

The intermediate portion of the implement frame is braced longitudinally by an intermediate brace bar 79 (the rear end of which inclines upwardly (Fig. 3), and is bolted to an angularly shaped bracket 76 which is secured to the rear frame bar 65 by a bolt 77 (Fig. 1). The front end of the intermediate frame bar 75 is secured to a bracket 78, which projects from the rear end of a housing 79, carried by the implement frame. The front end of said housing has an angular recess 81 formed in its lower edge, which recess rests on the front frame bar 64, this portion of the housing being bolted or otherwise secured to the frame bar 64. The housing 79 encloses the power lift mechanism and the mechanism which governs the operation of the planter feeding plates, as will hereinafter appear.

Pivotally mounted for vertical swinging movement in the implement frame between the front and rear frame bars are three planter units 83, 84 and 85. These planter units are so disposed in the implement frame that the intermediate unit 84 is positioned centrally between the traction wheels 16 of the tractor, and the two lateral units 83 and 85 are positioned outwardly on each side of the traction wheels. As has been heretofore described, when the planting implement is attached to the tractor the front frame bar 64 is disposed forwardly of the drive wheels 16, under the intermediate portion of the tractor, and the rear frame bar 65 is disposed in rear of the drive wheels. By virtue of this relation of the implement frame with respect to the tractor, it will be apparent that the three planter units 83—84 and 85 can be disposed in the transverse plane of the wheels 16, and approximately in the vertical axial plane of the wheels. In describing these planter units, I shall only refer to one of the units, as all three are substantially duplicates. Each "planter unit" embraces in its entirety a furrow opener, a seed hopper, a seed feeding or selecting plate, seed dropping valve mechanism, and a covering wheel. All of these parts are carried by a shank 86, which constitutes a main supporting member for the planter unit. The furrow opened is preferably in the form of a runner 87, although a disc type of furrow opener might be employed. The rear end of the runner is secured to the shank 86, and the upwardly curved forward end thereof is braced to the shank by a brace bar 88. The seed hopper 89 is mounted on the upper end of the shank 86, and revolving in the bottom of this seed hopper is a seed feeding or selecting plate, not shown. Disposed below such plate and operatively connected thereto is a bevel driving gear 91 (Fig. 2), through which the seed plate is driven. The seed kernels discharged by the plate fall into the runner shank 86 where they come under the control of the seed dropping valve mechanism. Such valve mechanism comprises upper and lower valves which are actuated simultaneously to control the dropping of the seeds down through a passageway in the runner shank 86 and into the furrow opened by the runner 87. The seed feeding plate and the seed dropping valve mechanism are old and well known, and hence I have not deemed it necessary to disclose the detailed construction thereof.

The depth of the seed furrow opened by the runner 87 of each planter unit is controlled by a pair of wheels 94 which are disposed in rear of the runner shank 86. Both wheels are mounted side by side on a shaft 95 carried in a yoke 96 (Fig. 4), the two side arms of which extend forwardly on opposite sides of the shank 86 and have pivotal mounting on a bolt 97 extending through the front edge of the shank. A second bolt 98 passes between the arms of the yoke and through a solt 99 formed in a wing or lug projecting rearwardly from the shank, this slot being curved on an arc having the pivot bolt 97 as its center. It will be evident that by loosening the bolt 98, the wheels 94 may be swung upwardly or downwardly so as to engage the ground when the furrow opener has moved down to a greater or lesser penetration. The adjusted setting of the wheels 94 will, therefore, control the depth of the furrow opened by the runner 87. Such wheels are bevelled so that they will also function as covering wheels, being spaced sufficiently far apart to engage the ridges of soil at each side of the furrow to deflect or turn these ridges of soil back into the furrow over the seed. A suitable scraper blade 101 is pivotally connected to the fork 96 and is arranged to remove clods of earth from the wheels 94.

Each planter unit has pivotal connection with the implement frame through upper and lower parallel links 104 and 105. The rear ends of the links have pivotal connection with the planter unit on vertically spaced pivots 106 and 107, and the front ends of the links have pivotal connection with the frame on vertically spaced pivots 108 and 109. As shown in Fig. 7, each link consists of two bars bolted together, with the front ends of the bars separated to form pivot yokes or forks. Such yokes establish widely spaced points of bearing support, between the front end of each link and the implement frame, whereby the planter unit is firmly supported against lateral tipping. The above described mounting of each planter unit permits the unit to move upwardly and downwardly relative to the implement frame, thereby enabling the runner 87 to adapt itself to the contour of the ground, under the depth regulating control of the covering wheels 94. The two links and their pivots are so proportioned and arranged that in such up and down movement the unit is held at all times in the same angular relation to the vertical, in contradistinction to a fore and aft tilting of the planter unit, which would result in cross-checking inaccuracies.

Referring to Fig. 7, it will be noted that the front ends of the parallel links have pivotal connection with brackets 112 from which extend arms 113 which are bolted to the upper flange of the front frame bar 64. Each bracket is also secured to the vertical flange of the frame bar by a bolt 114 (Fig. 2), which passes through a boss 115 formed as an integral part of the bracket. The pivot bolt or bolts 108 for the upper link 104 engage in the upper portion of the bracket, and the pivot bolt or bolts 109 for the lower link engage in an arm depending from the lower portion of the bracket. Extending transversely across the front end of the implement frame, and rotatably supported in the three brackets 112, are upper and lower shafts 117 and 118. The upper shaft 117 constitutes a driving shaft through which power is transmitted to the seed plate gears 91 of the three planter units, and the lower shaft 118 constitutes a driving shaft through which operating impulses are transmitted to the seed dropping valve mechanisms in the three units. The driving shaft 117 is divided into three alined sections, 117a, 117b and 117c disposed coextensively across the frame. The intermediate section 117a extends transversely through the housing 79, having operative connection therein with mechanism to be later described which drives the shaft 117 under the control of the shaft 118. The two lateral shaft sections 117b and 117c consist of square shafts adapted to have releasable coupling with the ends of the intermediate section 117a through socket sleeves 121. As best shown in Fig. 7, one of these socket sleeves is rigidly secured to the inner end of each lateral shaft section, and the extending end of each sleeve is adapted to be slipped over the adjacent end of the intermediate shaft section 117a, which latter shaft section is round. The sleeves are releasably coupled to the intermediate shaft section by cotter pins 122, which also function as shear pins to prevent breakage of the operating parts in the event of jamming of the feed plate mechanism.

The rotation of the shaft 117 is transmitted to the feed plate gears 91 of the three planter units through individual shafts 123, which have bevel gear connection with the cross shaft 117 and which extends rearwardly to the planter units. Fig. 7 illustrates the driving relation between the cross shaft 117 and the rearwardly extending shaft 123 of the intermediate planter unit. The shaft section 117a extends through the hub 124 of a bevel gear 125, having keyed or pinned engagement therewith to drive the gear. The hub 124 has bearing support in a bearing boss 126 extending upwardly from the bracket 112. The bevel gear 125 meshes with a bevel gear 127 which has a relatively long bearing hub 128 journaled in a boss 129 that also extends upwardly from the bracket 112. The hub 128 has a square socket 131 formed in its rear end, into which extends the front end of the rearwardly extending shaft 123. The rear end of such shaft has operative connection with the planter unit for driving the seed selecting plate gear 91, and it will hence be seen that such end of the shaft must be capable of vertical swinging movement with the rise and fall of the planter unit. Such swinging movement is accommodated by a universal joint connection between the front end of the shaft 123 and its driving gear 127, formed by upsetting or swaging the end of the shaft 123 to form an enlarged head 132 of square cross section, which engages non-rotatably in the square socket 131. The shaft is capable of a limited endwise movement within the socket, to accommodate any slight shifting of the shaft which may be incident to the vertical movement of the planter unit. The rear end of the shaft 123 has suitable support in a bearing carried by the runner shank 86, and carries a bevel gear which meshes with the bevel gear portion 91 of the seed selecting plate. It will thus be seen that rotation of the shaft 117a is operative to drive the seed selecting plate of the planter unit irrespective of the furrow opening depth adjustment of the unit, or of its rise and fall in passing over uneven ground. The seed selecting plates of the two lateral planter units 83 and 85 are driven through a substantially identical arrangement of bevel gears mounted on the two laterally disposed brackets 112 (Fig. 4). The outer ends of the two shaft sections 117b and 117c extend into square sockets formed in the bearing hubs of the two outer bevel gears 125 so that these lateral shaft sections can be slid outwardly through the gears to release their inner sleeve ends 121 from the ends of the intermediate shaft section 117a. This is for the purpose of removing the two outer shaft sections 117b and 117c from the path of the tractor wheels 16 when the wheels are to be driven across the front end of the frame, in attaching and detaching the planting implement. After the tractor wheels have been driven over the frame bar 64, the shaft sections 117b and 117c are slid inwardly through their respective bevel gears and their sleeve ends 121 are recoupled to the ends of the intermediate shaft section 117a by replacing the cotter pins 122.

It will be noted from Fig. 7 that each socket sleeve 121 has a pair of diametrically opposite holes 122a therein for receiving the cotter pin 122. Similarly, the driving shaft section 117a has a diameterical hole 122b with which the holes 122a must be alined when the cotter pin is to be inserted. It will be evident from the foregoing that it is only possible to couple each lateral shaft 117b—117c to the intermediate shaft 117a in two angular positions, determined by the alinement of the holes 122a and 122b.

Each seed-selecting plate, driven by its gear 91, is of the type having a plurality of seed cells which are moved successively over a seed dropping opening to discharge an individual seed kernel from each cell into such opening. By changing the gear ratio of the variable speed unit carried by the housing 79, in a manner to be hereinafter described, the selecting plate can be revolved in each intermittent actuation to move two, three or four of such pockets over the seed dropping opening to drop two, three or four seeds, respectively, for a plant hill. By substituting these plates, the number of seeds dropped in each plant hill actuation can be increased or decreased as desired. In the operation of the seed selecting plates, it is important that a predetermined timed relation be maintained between each plate and the main driving shaft represented by the shaft section 117a. Otherwise in the actuation of the seed plate the last cell of each series of two, three or four cells may stop only part way over the seed dropping opening, or some variable factor may develop, which would destroy the accuracy of the seed selecting mechanism. To obviate the possibility of a mis-timing of the seed plates, the operative connection which is established between the main driving shaft 117a and each of the lateral shaft sections 117b and 117c is such that the shafts can only be connected when the lateral shaft sections are in proper timed relation to the intermediate or driving shaft section. The number of seed cells in each seed plate 91 is a multiple of two. The number of possible angular positions in which each lateral shaft section can be coupled to the intermediate shaft section is two, i. e., in order to pass the cotter pin 122 through the diametrical holes 122a and 122b, the lateral shaft section must be in either one of two angular positions differing by 180°. Each lateral shaft section can only be coupled to the intermediate shaft in one or the other of these two angular positions, in either of which the properly timed relation is reestablished between the shafts owing to the fact that the number of seed cells in each plate is a multiple of two. Thus the connecting means afforded by each cotter pin 122 and the diameterical holes 122a—122b compels the reestablishment of the train of seed plate operating parts in properly timed relation, after each attachment and detachment of the implement.

To facilitate driving the tractor wheels forwardly or backwardly across the front frame bar 64 when attaching or detaching the implement, bridge members or ramps 136 are secured to such frame bar at points spaced correspondingly to the tread of the tractor wheels. One of such bridge members or ramps is illustrated in section of Fig. 6. It will be noted that it comprises an arched plate 137 having flanged ends secured to a flat plate 138. The frame bar 64 extends transversely through the arch of each of these ramps, being suitably secured to the underside of the high portion of the arch. The flat plate 138 is adapted to rest upon the ground and it will hence be seen that when driving the tractor wheels over the ramp, the weight of the rear portion of the tractor is transmitted through the plates 137 and 138 directly to the ground and that no portion of such weight is borne by the bar 64 or any other portion of the implement frame. Channel bars 139 extend transversely of the arched plate 137 to reinforce the same and to provide traction surfaces, enabling the tractor wheels to travel up the inclined ends of the ramp. While the drawings do not show the drive wheels equipped with the usual traction lugs or grousers, it will be understood that under most conditions these lugs will be used. Such lugs or grousers will not injure the ramps 136. The travel of the wheels over the ramps is guided laterally by flanges 141 which are turned upwardly from the ends of the arched plates 137. After the bolts 71 and 74 have been removed and the center seed hopper 89 taken off, the only preparatory steps necessary to be performed before the tractor wheels can be driven over the ramps are the outward shifting of the shaft sections 117b and 117c, as above described, and the shifting of the upper ends of the diagonal brace rods 72 out of the path of the tractor wheels.

It will be noted that the lower shaft 118 extends through the ramps, alongside the frame bar 64, and hence it is not necessary to uncouple or disconnect this shaft preparatory to driving the tractor wheels across the ramps. As before remarked, such shaft has bearing support in bearing bosses carried by the brackets 112, and mounted on the ends of such shaft beyond the outermost brackets 112 are arms 144 which have pivotal connection at 145 with rearwardly extending links 146. The rear ends of such links have pivotal connection with check forks 147 of check heads 148, there being one of these check heads mounted on each side bar 66 substantially in the transverse plane of the three planter units. The type of check head shown comprises a tripping or releasing arm 149, which is adapted to be engaged by a large doffing button on the check wire for the purpose of opening the check head, so as to doff the wire at predetermined points adjacent to the ends of the rows. The improved feature of this check head, and of the doffing button which cooperates therewith, have been made the subject-matter of my co-pending application, Serial No. 217,569, filed September 6, 1927. Referring again to Fig. 2, it will be noted that the check shaft 118 has a depending arm 152 secured thereto in the plane of each planter unit. Pivotally connected to each arm at 153 is a motion transmitting link 154 which extends rearwardly to the runner shank 86. Here this link has pivotal connection with an operating arm or like member, which serves to actuate the seed dropping valve mechanism embodied in the runner shank. In another one of my co-pending applications, Serial No. 220,473, filed September 19, 1927, I have shown the operating connection between the inner end of the link 154 and the valve mechanism. In this latter application, the planter units are likewise supported on parallel links, and one of the features of such application is the arrangement of parts whereby vertical movement of the planter unit cannot cause operation of the seed dropping valve mechanism nor cause any variation in the normal operating relation thereof. This same arrangement of parts is followed in the present construction—i. e., the motion transmitting link 154 extends substantially in parallelism with the parallel mounting links 104 and 105, and the pivotal centers of the motion transmitting link 154 are so related to the pivotal centers 106—107 and 108—109 of the mounting links that the rise and fall of the planter unit in traveling over irregularities in the surface of the ground cannot cause operation of the seed dropping valve mechanism nor cause any variation in the normal operating relation of such valve mechanism. Another feature disclosed in the latter co-pending application is an arrangement whereby the check heads can be shifted fore and aft along the sides of the implement frame to compensate for different speeds of travel of the implement, the length of wire used across the field, or for any other factors which might influence the cross registration of the sets of hills. Such feature has also been incorporated in the present construction, and to the end of describing the same briefly, it may be remarked that the frame bars 66 are provided with a plurality of closely spaced holes for receiving the attaching bolts 156 of the check heads with the check heads set in different positions along the frame bars and the front ends of the operating links 146 are each provided with a correspondingly spaced series of holes for receiving the pivot pins 145, in order that the effective lengths of the links 146 can be increased or decreased with the different settings of the check heads along the frame.

The mechanism which causes the intermittent rotation of the feed shaft 117 is old and well known, and hence I shall only describe the same in brief, sufficient to give an understanding of the operating cycle of the seed feeding plates etc. Referring to Figs. 7 and 8, such mechanism comprises a trip clutch 158 and a variable speed set of gears 159, both of which are contained within the housing 79. Formed on the driving element of the clutch 158 is a bevel gear 161, which is driven by a bevel pinion 162, mounted on a longitudinal drive shaft 163, also journaled in the housing 79. Mounted on the check shaft 118, within the housing, is an arm 164 which carries a roller 165 at its end. Said roller cooperates with a spring pressed dog 166, which is carried by the driver element of the clutch and which has a roller 167 adapted to be pressed outwardly into recesses 168 formed in the interior of the driving clutch element. Normally the roller 165 is held in the path of the dog 166 and at such time the roller 167 is held out of these recesses 168. When a button on the check wire strikes one of the check forks 147, the check shaft 118 is rocked to swing the roller 165 clear of the dog 166, whereupon the clutch roller 167 swings into one of the recesses 168. The clutch remains in engagement through one complete revolution, being released by the dog 166 striking the roller 165, which has now been returned to normal position. A tension spring 169 is hooked to the arm 164, below the shaft 118, this spring operating to return the check shaft and tripping roller 165 to normal position. The spring 169 is confined in a lateral projecting enlargement 79' formed along one side of the housing 79.

The driven element of the clutch 158 comprises a sleeve 172, which rotates freely on the shaft 117a, and which has operative connection with the variable speed set of gears 159. Said sleeve carries a suitable driving gear 173, which meshes with a driven gear 174 mounted on a countershaft 175. A plurality of gears of different sizes are secured to the countershaft to rotate simultaneously with the driven gear 174, and such latter gears mesh with other gears 176 of different sizes, which are mounted to rotate freely on the shaft 117a. The shaft 117a is adapted to be clutched to either one of these variable speed gears 176 through the instrumentality of a sliding clutch sleeve 177. The latter has keyed connection with the shaft so as to compel rotation of the shaft with the sleeve but permitting shifting movement of the sleeve along the shaft. Mounted on the inner end of the sleeve are one or more lugs adapted to register with corresponding lugs formed interiorly of the variable speed gears 176. The sleeve is shifted for effecting operative engagement with any one of these gears through the instrumentality of a manually operated shifting lever 178. A fork 179 extending upwardly from the hub of said lever engages over trunnion pins mounted on a collar 181 rotatably carried by the sleeve 177. By shifting the lever 178 to engage with one or the other of the notches in the segment plate 182, the sleeve 177 is shifted to effect clutching engagement with a corresponding one of the variable speed gears 176. It will be evidenced from the foregoing that the oscillation of the shaft 118 will trip the clutch 158, which will in turn transmit rotation to the feed shaft 117 through the variable speed gearing 159. The degree of rotative movement of the feed shaft 117 will be governed by the speed selection which has been made by the lever 178, whereby a greater or lesser number of seed kernels will be delivered by the seed plates driven by the gear 91.

The driving shaft 163 extends from the rear end of the housing 79 and has a sprocket wheel 184 secured thereto. The driving chain 58, which extends down from the sprocket 57 on the power take-off shaft 54, passes around the sprocket wheel 184. Hence the shaft 163 rotates continuously with the power take-out shaft 54. The shaft 163 is formed with an enlarged portion 163' having thrust bearing engagement with bearing bushings 185 and 186, mounted in the housing 79. Formed on the enlarged portion 163 is a worm 187 which meshes with a worm wheel 188. Such worm wheel transmits driving rotation to a power lift clutch 189, which is enclosed within the housing 79. The clutch comprises an annular driving element 191 and an annular driven element 192, the worm wheel 188 being preferably formed as a part of the driving element 191. Both clutch elements are mounted on a shaft 193, the driving clutch element 191 rotating idly thereon and the driven clutch element 192 being pinned to said shaft to drive the same when the clutch is engaged. The peripheral portion of the driving clutch element is formed with a plurality of internal recesses 194 with which a clutch roller 195 is adapted to engage. The clutch roller is mounted on one arm of a bell crank lever 196, which is pivoted at 197 to the driven clutch element 192. The other arm 198 of the bell crank lever 196 extends through a slot in the peripheral portion of the driven clutch element 192, in position to be engaged by a tripping member which I shall presently describe. A second bell crank lever 199 is pivoted to the driven clutch element at 201, and has operative connection with the first bell crank lever 196 through a link 202. A tripping arm or finger 203 extends from this latter bell crank lever through a slot in the driven clutch element, similarly to the first mentioned tripping arm 198. A tension spring 204 is connected at one end to any fixed point 205 on the driven clutch element and at its other end is connected with a lug 206 extending from the first named bell crank lever 196. Such spring normally tends to swing the clutch roller 195 into one of the recesses 194 of the driving clutch element. The clutch is normally held disengaged by a roller 207, which is held within the path of one or the other of the tripping fingers 198—203. Such roller is mounted between the ends of a pair of arms 208, which extend downwardly from a clutch tripping shaft 209. It will be evident that upon swinging the roller 207 upwardly to clear the finger 198, the clutch will instantly become engaged through the action of the spring 204 swinging the clutch roller 195 into one of the recesses 194. Such engagement of the clutch will continue until the roller 207 strikes the opposite tripping finger 203, whereupon the clutch roller 195 will be withdrawn from the recesses 194. For the purpose of locking the driven clutch element after each disengagement of the clutch, lugs 211 are extended radially from the driven clutch element to define notches into which roller 207 can drop after it has effected clutch releasing engagement with either arm 198 or 203. Referring to Fig. 2, the clutch control shaft 209 extends outwardly through the side of the casing cover and is provided with a downwardly extending arm 212. A tension spring 213 connected to such lever normally tends to hold the tripping roller 207 in its normal position-engaging between one or the other of the pairs of lugs 211. An operating link 214 is connected to the arm 212 and extends rearwardly to a control pedal 215, with which the rod has pivotal connection as indicated at 216. The pedal is pivotally mounted at 217 on a reel supporting frame, which I shall presently describe, the pedal being disposed in a convenient position under the operator's seat 35. When it is desired to lift the planter units and the marker arm, it is only necessary for the operator to press down momentarily on the pedal 215.

This withdraws the tripping roller 207 from the path of finger 198, permitting the clutch to engage. When the driven clutch element has revolved through a half revolution, the roller 207, which has returned to normal position through the release of the pedal 215, will ride up over the leading lug 211 and will engage the other tripping finger 203, resulting in the immediate disengagement of the clutch. The roller 207 will also lock the driven clutch element in stationary position, thus holding the planter units in their raised positions. When the operator desires to lower the planter units into engagement with the ground, he merely gives the pedal 215 another downward stroke, which lifts the roller 207 clear of the end of the tripping finger 203 and permits the clutch to operate through another half cycle, corresponding to a repetition of the half cycle described above.

I shall now describe the operating linkage through which the rotation of the driven clutch element 192 is effective to raise and lower the planter units. The shaft 193, which rotates with the driven clutch element, extends through one side of the housing 79 and has a crank arm 221 mounted thereon (Fig. 7). Pivotally connected to the end of said crank arm at 222 is a rearwardly extending link 223. The latter is pivoted at 224 to an arm 225 depending from a rock shaft 226, which extends transversely of the implement frame, adjacent to the rear end thereof (Fig. 3). The shaft is of square cross section, and the arm 225 is rigidly clamped thereto by a U-bolt 227, which embraces one side of the shaft and has its ends passing through holes in the hub portion of the arm. Referring to Fig. 9, the shaft 226 has bearing support adjacent to its ends in bearing brackets 228, which are secured to the rear frame bar 65. Circular bearing sleeves 229 are secured to the shaft to rotate within the bearing hubs of the brackets 228. The intermediate bracket 76, which connects the intermediate frame bar 75 to the rear frame bar 65, may also be provided with a similar construction of bearing for supporting the intermediate portion of the rock shaft.

Secured to said shaft directly in rear of each planter unit is a curved lifting arm 231 (Fig. 2). Each of such arms is secured to the shaft by a U-bolt 232, similarly to the mounting of the actuating arm 225. Referring again to Fig. 9, it will be noted that each arm 231 consists of two bars secured together side by side and having their ends separated to form a pivot yoke 233. Mounted in said pivot yoke on trunnion pins 234 is a sleeve 235. A lifting rod 236 passes freely down through the sleeve 235 and has its lower end connected with the adjacent planter unit. The rod 236 is preferably connected with the wheel supporting fork 96, through which the depth adjustments of the planter unit are made, although it will be understood the rod 236 may be connected directly to the runner shank 86. In connecting the rod to the wheel supporting fork 96, the lower end of the rod is extended into an end cap 237, from which project trunnion pins 238 having pivotal support between the side arms of the fork 96. A head 239 on the lower end of the rod compels upward movement of the end cap 237 and of the planter unit with the lifting of the rod, and a stud or pin 241 prevents the rod from dropping down through the lower end of the cap 237. The upper portion of the rod 236 is threaded and screwing down over such threaded portion is a stop nut 242. Such nut is normally positioned on the rod so that the latter has lost motion movement within the sleeve 235 for accommodating the full range of up and down movement to which the planter unit may be subjected in traveling over irregular ground or along a ridge, depression or the like. The location of the nut 242 is such, however, that when the power lift clutch 189 is energized and the lifting shaft 226 is rocked through a lifting oscillation, the sleeve 235 will engage the nut and swing the planter unit upwardly to a position clear of the ground. This same lost motion relation between the sleeve 235 and nut 242 is provided at each planter unit, so that the several units are free to rise and fall independently of each other when in their operative positions.

Pivotally mounted at the rear corners of the implement frame are marker arms 245, on the outer ends of which are supported discs or other suitable marker elements 246 (see Fig. 1). The inner end of each marker arm is secured between semi-circular clamping members 247, which have their inner ends shaped to form two sides of a clevis 248 through which passes a bolt 249 (see Fig. 9). Pivotally connected between the arms of the clevis on the bolt 249 is an arm 251. Such arm is formed with a rearwardly extending bearing portion 252, which is journaled in a bearing bracket 253, the latter being bolted to the downwardly turned end 65' of the frame bar 65. Extending inwardly from the opposite end of the bearing portion 252 is an arm 254 on which is mounted a roller 255. This roller is disposed within the path of the cam arm 256, which is mounted on the end of the lifting shaft 226. Fig. 12 illustrates the manner of attaching such cam arm to the lifting shaft. It will be noted that the inner end of the arm is formed with a square socket 257 for engaging over one side of the shaft. A U-bolt 258 engages over the other side of the shaft and has its ends passing through lugs 259 which are formed on a lateral extension of the arm.

It will be understood that the marker arm at the other side of the implement is similarly provided with an arm 254 and roller 255 to be actuated by a duplicate cam 256 at the other end of the lifting shaft. The arrangement is such that when the planter units are down in their operative positions in contact with the ground, the two cam arms 256 extend rearwardly out of contact with the rollers 255. When the power lift clutch is energized to rock the lifting shaft 226, the cam arms 256 are swung forwardly, simultaneously with the lifting of the planter units, and in such forward movement one of the cam arms exerts a downward pressure on the roller 255 of whichever marker arm is down in ground-engaging position, causing such marker arm to swing upwardly to its inoperative position. It will be noted that the cam arms 256 are appropriately curved to follow the swinging movement of the rollers 255. Referring to Fig. 3, it will be noted that a link 262 is pivotally connected at one end to the operating arm 225, and at its other end has connection to a tension spring 263. The front end of such spring is attached to a link 264, which has adjustable connection with a bracket 265 mounted on the intermediate frame bar 75, the adjustable connection between the link 264 and bracket 265 permitting the tension of the spring to be increased or decreased as desired. Such spring tension partially or entirely counter-balances the weight of all of the planter elements and also the weight of one of the marker arms, thereby relieving the power lift clutch of the burden of lifting the entire weight of these parts.

As the marker arm swings upwardly to its raised position, it comes into engagement with a latch 268, which is mounted on the rear frame bar 65. Referring to Figs. 9, 10 and 11, it will be seen that the latch is bolted to an arm 269 which has a forked inner end pivotally supported at 271 on a bracket 272. The bracket is bolted at 273 to a bar 274, which is in turn bolted to the rear frame bar 65, as indicated at 275. The bar 274 is arched upwardly to support the latch at the elevated point shown. A compression spring 277 is confined between the bracket 272 and the latch 268, such spring normally tending to swing the latch forwardly to its operative position. Any suitable stop shoulder may be arranged on the bracket 272 to engage the arm 269 and thereby limit the movement of the latch in this direction. The outer face of the latch is formed with a curved surface 279, which is engaged by the marker arm 245 as the latter swings upwardly, the latch being cammed rearwardly by the engagement of the rocker arm with said sloping surface until the arm passes the extremity of the latch, whereupon the latter snaps back around the outer side of the marker arm and holds the same in its raised position. It frequently happens that these marker arms swing upwardly with a considerable velocity and it is, therefore, desirable that means be provided for cushioning or yieldably stopping the arms at the upper limits of their swinging movements.

To this end, I have mounted in the bracket 272 a spring pressed block 281, which is adapted to be struck by the marker arm at the upper limit of its movement. Referring to Fig. 11, said block is slidably mounted in a bore 282 formed in the bracket, a pin 283 being extended from said block through the rear end of the bore to aid in guiding the movement of the block. A relatively stiff compression spring 284 is confined in the bore 282 in back of the block 281. Any suitable pin or stud 285, mounted in the rear end of the guide pin 23 serves to hold the block against outward displacement from the bore. As the marker arm swings past the latch 268, it strikes the block 281, which yieldably resists further movement of the arm, thereby preventing shock and possible breakage of the arm. It will be understood that a similar latch 268 and spring pressed block 281 is provided for the marker arm at the opposite side of the implement. If desired, tripping ropes 287 may be connected to the outer end of each latch arm 269 and extended up to the operator's seat 35, or to some other point convenient thereto, so that the operator can trip the latch of either marker arm from his position on the seat, to drop the appropriate marker arm as he starts the implement back across the field. The marker arms may be braced against the draft stresses set up therein by guy rods 288, which are suitably connected at their rear ends to the outer portions of the marker arms, and which have pivotal connection at their front ends with eyes 289 mounted on the front frame bar 64.

According to the present construction, I have provided power-driven means for winding the check wire upon the reel after the completion of the planting operation. Referring to Fig. 7, it will be noted that the end of the driving shaft 163 is counter-bored for receiving the cylindrical end 291 of a square shaft 292. The cylindrical end portion 291 affords a front bearing for the shaft 292, and the rear end of such shaft has bearing support in a boss 293, which is formed integral with the bracket 76 (Fig. 1). The rear side of the sprocket wheel 184 is formed with clutch teeth 294, and cooperating with these teeth is a toothed clutch collar 295, which is shiftably but non-rotatably mounted on the square shaft 292. A compression spring 296 is confined between the rear end of the clutch collar and a stop collar 297, which is secured to the shaft 292, the spring normally tending to shift the clutch collar forwardly into engagement with the clutch teeth 294. The position of the shiftable clutch collar 295 is controlled by a fork 298, which is pivoted to the intermediate frame bar 75 at 299, and which has its fork arms engaging in a groove 301 in the clutch collar. A link 302 is connected at its forward end to the shifting fork, and at its rear end is pivotally connected at 303 to a control lever 304. The lever is pivotally mounted on the reel frame 305 on a pivot 306, which is disposed forwardly of the pivot 303 (see Fig. 3). By virtue of this relation of pivots, when the lever 304 is swung forwardly, the pivot 303 is swung upwardly past the center of the pivot 306 so that the clutch is held disengaged against the pressure of the spring 296. When the lever 304 is swung backwardly, the pivot 303 moves downwardly past the center of the pivot 306, thereby allowing the spring 296 to shift the clutch collar 295 into operative position, and to hold the collar in such position. The control lever 304 is provided with suitable stops 307 adapted to engage the reel supporting frame 305 for holding the lever in each of the above described positions. Referring to Fig. 4, the reel frame 305 is secured to the rear frame bar 65 of the implement so as to project rearwardly therefrom. Mounted on the side bars of the reel frame are bearings 308 adapted to receive the spindle of the reel 309. The rear end of the reel drive shaft 292 has a bevel gear 312 mounted thereon in front of the bearing boss 203 (Fig. 2). The gear 312 meshes with another bevel gear 313, which has bearing support in another bearing boss 314, carried by the bracket 76 (Fig. 3). A sprocket wheel 315 is secured to the latter bevel gear 313 and drives a chain 316, which passes upward over a sprocket wheel 317. The latter sprocket wheel drives the bearing socket in which one end of the reel spindle is mounted. The specific construction of this reel spindle and the manner in which driving rotation is transmitted thereto is old and well known, and need not be described in detail. After the completion of the planting operation, the reel is replaced in the frame 305 with its spindle ends engaged in the bearing sockets 308. By now actuating the lever 304 to shift the clutch collar 295 into engagement with the clutch teeth 294 a winding rotation will be transmitted to the reel through the driving connections above described. Hence with the implement standing still, the check wire can be quickly wound upon the reel 309 through the power driven rotation thereof.

A laterally swinging guide 319, which is pivotally mounted on the rear end of the reel frame 305, serves as a manually operated guiding device for directing the wire to different points along the length of the reel in order to obtain a level winding of the wire thereon.

The seed planting operations will be generally understood by those skilled in the art, and hence I shall only briefly summarize these operations. The engagement of each button on the check wire with one of the check forks 147 will rock such fork, which will transmit rocking motion to the check shaft 118 through the link 146. This shaft will, in turn, transmit motion through the three links 154 to actuate the seed dropping valve mechanisms of all three planter units, whereby the seed is dropped simultaneously into all three seed furrows. Such rocking movement of the shaft 118 also swings the arm 164 and releases the roller 165 from the spring pressed dog 166, so that with each actuation of the check shaft 118 the trip clutch 158 is engaged, whereby driving rotation is transmitted to the shaft 117 and to the seed feeding plates for feeding another accumulation of seed kernels to the seed dropping valve mechanism of each planter unit. The disengagement of the trip clutch 158 occurs automatically at the completion of its cycle of one revolution.

When the implement reaches the end of the set of rows, the operator depresses the pedal 215 which trips the lift clutch 189, resulting in rocking movement being transmitted to the shaft 226. Such movement of the shaft 226 lifts all three planter units to their transport positions through the lifting arms 231, and also operates to swing the marker arm 245, which has been down in engagement with the soil, up to its raised position. The doffing of the check wire is preferably performed automatically, as previously remarked. After the implement has been turned around, the operator depresses the pedal 215 again, which causes a second engagement of the lift clutch 189, and thereby lowers the planter units to their operative positions in engagement with the ground. The check wire is then restaked and placed in the other check head, and the other marker arm is lowered by tripping the appropriate latch 268, whereupon the operator is ready to start planting the next set of rows.

When it is desired to disconnect the implement from the tractor, the front and rear ends of the implement frame are released from the tractor by removing the bolts 71 and 74; then the lateral drive shafts 117b—117c, together with the diagonal braces 72 are removed from the path of the tractor wheels, all as previously described. The hopper 89 of the intermediate planter unit is also detached to permit the rear bar 33 of the tractor to clear such planter unit, and the drive chain 58 is disconnected from the sprocket wheels 57—184. Thereupon, the tractor drive wheels 16 can be driven out of the implement frame across the ramps 136. The reattachment of the implement to the tractor is merely a reversal of the above operations.

So far as I am aware, I am the first in the art to provide a tractor planter in which the planter units are disposed in the transverse plane of the tractor drive wheels. The provision of power lift mechanism for raising and lowering the planter units, entirely under the control of the operator, is also an important innovation in these implements, as is also the power lift of the marker arms. Therefore, the claims hereinafter made are intended to be construed generically, except insofar as they may be directed to particular features of the construction shown and described.

What I claim as my invention, and desire to secure by Letters Patent, is:—

1. The combination with a tractor having drive wheels, of a planting implement connected to said tractor and comprising a plurality of planter units comprising seed dropping mechanisms disposed between and on the outer sides of said drive wheels.

2. The combination with a tractor having rear drive wheels, of a planting implement supported in its entirety on said tractor, and comprising a plurality of planter units comprising seed dropping mechanisms substantially laterally flanking each of said drive wheels.

3. The combination with a tractor having rear drive wheels, of a planting implement comprising a frame connected to said tractor, and three planter units comprising seed dropping mechanisms mounted on said frame with the intermediate unit disposed between said drive wheels and the lateral units disposed on the outer sides of said wheels.

4. The combination with a tractor having rear drive wheels, of a planting implement comprising a frame connected to said tractor, and a plurality of planter units comprising seed dropping mechanisms connected to said frame for independent vertical movement relatively thereto, each of said planter units being disposed in substantially lateral alinement with said drive wheels.

5. The combination with a tractor having a traction wheel, of a planting implement comprising a frame having seed dropping mechanism thereon and adapted to be attached to said tractor, said frame being positioned to completely encompass said traction wheel and to be disposed adjacent the latter for supporting said seed dropping mechanism in close proximity to both sides of said wheel.

6. The combination with a tractor having rear drive wheels, of a planting implement adapted to be attached to and detached from said tractor, comprising a frame arranged to encompass said drive wheels, and a plurality of planting implements comprising seed dropping mechanisms connected to said frame to be disposed substantially in lateral alinement with said drive wheels.

7. The combination with a tractor having rear drive wheels, of a planting implement comprising a frame having a front frame bar, means for connecting said frame to said tractor with said front frame bar disposed in front of said drive wheels, and a plurality of planter units comprising seed dropping mechanisms pivotally connected with said front frame bar and disposed substantially in lateral alinement with said drive wheels.

8. The combination with a tractor having rear drive wheels, of a planting implement comprising a frame having front and rear frame bars, means for connecting said frame to said tractor with said front and rear frame bars disposed in front and in rear respectively of said drive wheels, and a plurality of planter units comprising seed dropping mechanisms pivotally connected to said front frame bar and disposed substantially in the transverse plane of said drive wheels.

9. The combination with a tractor having rear drive wheels, of a planting implement comprising a frame having front and rear frame bars, means for connecting said frame to said tractor with said front and rear frame bars disposed in front and in rear respectively of said drive wheels, three planter units comprising seed dropping mechanisms arranged with the intermediate unit disposed between said drive wheels and the lateral units disposed on the outer sides of said drive wheels, link means connecting each of said planter units with said frame for permitting said units to rise and fall relative to said frame, independently of each other, and means mounted on said frame for lifting said planter units to inoperative positions.

10. The combination with a tractor having rear drive wheels, of a planting implement comprising a single frame including members for mounting said frame on said tractor, one of said members extending transversely of the tractor and outwardly beyond the vertical planes of said drive wheels and adapted for supporting planter units to either side of the vertical planes of either or both drive wheels, a plurality of planter units comprising seed dropping mechanisms disposed substantially in lateral alinement with said drive wheels, and parallel link mechanism connecting each of said planter units with said frame, arranged whereby each unit is free to rise and fall relative to said frame while being maintained in its same angular relation to the vertical.

11. The combination with a tractor having rear drive wheels of a planting implement comprising a frame connected to said tractor and embracing said drive wheels, a plurality of planter units mounted on said frame, each of said planter units comprising seed dropping mechanism, and operating means mounted on said frame and operatively connected to each of said seed dropping mechanisms, said operating means extending transversely of said frame in front of said rear drive wheels.

12. The combination with a tractor having rear drive wheels, of a planting implement comprising a frame mounted on said tractor and embracing said drive wheels, a plurality of planter units pivotally connected with said frame, each of said planter units comprising seed dropping valve mechanism, and an operating shaft mounted on said frame and operatively connected with each of said seed dropping valve mechanisms, said operating shaft extending transversely of said frame in front of said rear drive wheels.

13. The combination with a tractor having rear drive wheels, of a planting implement comprising a frame mounted on said tractor and embracing said drive wheels, a plurality of planter units pivotally connected to said frame, each of said planter units comprising seed feeding means and seed dropping valve mechanism, a first operating shaft mounted on said frame and operatively connected with all of said seed feeding means, and a second operating shaft mounted on said frame and operatively connected with all of said seed dropping valve mechanisms, both of said shafts extending transversely of said frame in front of said rear drive wheels.

14. The combination with a tractor having rear drive wheels, of a planting implement comprising a frame supported in its entirety on said tractor, a plurality of planter units mounted on said frame in proximity to the transverse plane of said drive wheels, each of said units comprising seed feeding means and seed dropping valve mechanism, a lifting shaft extending transversely of said frame, and means operatively connecting said lifting shaft with each of said planter units for raising the latter to their inoperative positions.

15. The combination with a tractor having rear drive wheels, of a planting implement comprising a frame mounted on said tractor, a plurality of planter units pivotally connected to said frame and disposed substantially in the transverse plane of said drive wheels, each of said planter units comprising seed dropping mechanism, an operating shaft extending transversely of said frame in front of said drive wheels, means operatively connecting said shaft with each of said seed dropping mechanisms, a lifting shaft extending transversely of said frame in rear of said drive wheels, and means operatively connecting said lifting shaft with each of said planter units, for raising the latter to their inoperative positions.

16. The combination with a tractor having rear wheels, of a planting implement adapted to be attached to and detached from said tractor, comprising frame means having a transverse frame bar adapted to be disposed in advance of said rear wheels when the implement is attached to the tractor, a planter unit comprising seed dropping mechanism supported by said frame means, and means cooperating with the latter whereby the wheels of said tractor can be driven across said transverse frame bar without injury thereto in the attaching or detaching of the implement.

17. The combination with a tractor having rear wheels, of a planting implement adapted to be attached to and detached from said tractor, comprising a frame having one end thereof arranged to extend transversely of the tractor in advance of said rear wheels when the implement is attached to the tractor, and a plurality of planter units comprising seed dropping mechanisms connected to said frame, and means carried by the frame to aid the wheels at one end of said tractor in passing over the aforesaid one end of said frame to bring the tractor and frame into proper relation for attaching the implement to the tractor.

18. The combination with a tractor having rear wheels, of a planting implement adapted to be attached to and detached from said tractor, comprising a continuous open centered frame having one end thereof arranged to extend transversely of said tractor in advance of said rear wheels when the implement is attached to the tractor, a plurality of planter units comprising seed dropping mechanisms pivotally connected to said frame and arranged whereby said one end of said frame can be disposed in close proximity to the ground, and means carried by the frame to aid the wheels of said tractor in passing over the latter end of said frame to bring the tractor and frame into attaching relation.

19. The combination with a tractor having a pair of wheels at one end thereof, of a planting implement adapted to be attached to and detached from said tractor, comprising a frame arranged to encompass said tractor wheels when the implement is attached to said tractor, and a plurality of planter units comprising seed dropping mechanisms mounted on said frame and arranged whereby said tractor wheels can be driven over one end of said frame in the operation of attaching or detaching the implement.

20. The combination with a tractor, of a planting implement adapted to be attached to and detached from said tractor, comprising a plurality of planter units comprising seed dropping mechanisms, an operating member for said planter units mounted on the implement, and means carried by the implement and extending in protecting relation over said operating member to permit the wheels of the tractor to be driven over the same in attaching or detaching the implement.

21. The combination with a tractor having front and rear wheels, of a planting implement adapted to be attached to and detached from said tractor, comprising frame means having a frame bar arranged to extend transversely of the tractor between said front and rear wheels when the implement is attached to the tractor, a plurality of planter units supported by said frame means, each of said units comprising seed dropping mechanism, and ramp means associated with said transverse frame bar and arranged whereby the wheels at one end of said tractor can be driven across said ramp means in the attaching or detaching of the implement.

22. The combination with a tractor having a pair of wheels at one end thereof, of a planting implement adapted to be attached to and detached from said tractor, comprising a frame arranged to encompass said tractor wheels when the implement is attached to the tractor, a plurality of planter units comprising seed dropping mechanism mounted on said frame and arranged whereby said tractor wheels can be driven over one end of said frame in the operation of attaching or detaching the implement, and ramp means carried by the latter end of said frame, over which said tractor wheels can be driven.

23. The combination with a tractor having a pair of wheels at one end thereof, of a planting implement adapted to be attached to and detached from said tractor comprising a frame arranged to encompass the tractor wheels when the implement is attached to the tractor, a plurality of planting units mounted on said frame, and arranged whereby said tractor wheels can be driven over one end of said frame in the operation of attaching or detaching the implement, an operating member for said planter units extending transversely of said frame adjacent to the latter end thereof, and ramps secured to said frame and extending in protecting relation over said operating member to permit the wheels of the tractor to be driven over the same.

24. The combination with a tractor, having a pair of wheels at one end thereof, of a planting implement adapted to be attached to and detached from said tractor, comprising a frame arranged to encompass said tractor wheels when the implement is attached to the tractor, a plurality of planter units mounted on said frame and arranged whereby said tractor wheels can be driven over the front end of said frame in the operation of attaching or detaching the implement, each of said planter units comprising seed feeding means and seed dropping valve mechanism, a feed shaft and a check shaft extending transversely of said frame adjacent to the front end thereof, means operatively connecting said feed shaft with the feeding means of each of said planter units, means operatively connecting said check shaft with the seed dropping valve mechanism of each of said planter units, arched ramp members carried by the front end of said frame and extending in protecting relation over one of said shafts, and means permitting the other of said shafts to be withdrawn from the path of said tractor wheels when the latter are to be driven over said ramp members.

25. The combination with a tractor having a pair of wheels at one end thereof, of a planting implement adapted to be attached to and detached from said tractor, comprising a frame and a plurality of planter units mounted on said frame and arranged whereby said tractor wheels can be driven over one end of said frame in the operation of attaching or detaching the implement, each of said planter units comprising seed control means, operating mechanism for actuating said seed control means, said operating mechanism comprising means adapted to be removed from the path of the tractor wheels when the latter are to be driven over the end of said frame, and means compelling the reestablishment of the operative connection between said latter means and the remainder of said operating mechanism in predetermined timed relation.

26. The combination with a tractor having a pair of wheels at one end thereof, of a planting implement adapted to be attached to and detached from said tractor, comprising a frame and a plurality of planter units mounted on said frame and arranged whereby said tractor wheels can be driven over one end of said frame in the operation of attaching or detaching the implement, each of said planter units comprising seed control means, operating mechanism therefor comprising a train of connecting parts, one of said parts being disconnectible from the train to permit said tractor wheels to be driven over the end of the frame, and means for compelling the reestablishment of the operative connection of said latter part with said train of parts in predetermined timed relation.

27. The combination with a tractor having a pair of wheels at one end thereof, of a planting implement adapted to be attached to and detached from said tractor, comprising a frame and a plurality of planter units mounted on said frame and arranged whereby said tractor wheels can be driven over one end of said frame in the operation of attaching or detaching the implement, each of said planter units comprising a seed selecting device, a sectionalized shaft operatively connected for driving said seed selecting devices, one of the sections of said shaft being releasable from another of said sections to permit the tractor wheels to be driven over the end of the frame, and means for compelling the reestablishment of the operative connection between said shaft sections in predetermined timed relation.

28. The combination with a tractor having drive wheels at one end thereof, of a planting implement connected to said tractor and comprising a plurality of planter units disposed substantially in the transverse plane of said drive wheels, each of said units comprising seed feeding means and seed dropping valve mechanism, and power lift mechanism mounted on said planting implement and deriving its operating energy from said tractor, said mechanism being operatively connected for raising said planter units.

29. The combination with a tractor, of an implement adapted to be attached to and detached from said tractor and comprising a plurality of planter units, each of said units comprising seed feeding means and seed dropping valve mechanism, a power take-off shaft operatively connected to be driven by the engine of the tractor, and a power lift clutch mounted on said attachable implement and driven by said power take-off shaft, said clutch being operatively connected to lift said planter units to their transport positions.

30. The combination with a tractor, of a planting implement adapted to be fixedly attached to and detached from said tractor, comprising a frame and a plurality of planter units mounted on said frame for independent vertical movement relative thereto, each of said units comprising seed feeding means and seed dropping valve mechanism, a power take-off shaft operatively connected to be driven by the engine of the tractor, a lift clutch driven by said power take-off shaft and operatively connected for raising said planter units to their transport positions, and tripping means actuatable from the operator's position on said tractor for controlling said lift clutch.

31. The combination with a tractor, of a detachable planting implement comprising a frame adapted to be mounted in its entirety on said tractor, a plurality of planter units mounted on said frame for independent vertical movement relative thereto, each of said units comprising seed feeding means and seed dropping valve mechanism, a power take-off shaft operatively connected to be driven by the engine of the tractor, and a power lift clutch driven by said shaft and operatively connected for lifting said planter units to their transport positions.

32. The combination with a tractor, of a detachable planting implement comprising a frame and a plurality of planter units mounted thereon, each of said units comprising seed feeding means and seed dropping valve mechanism, a power take-off shaft operatively connected to be driven by the engine of the tractor, a power lift clutch mounted on said frame and operatively connected with said power take-off shaft, and means actuated by said power lift clutch for raising the planter units to their transport positions.

33. The combination with a tractor having drive wheels, of a planting implement connected to said tractor, and comprising a plurality of planter units disposed substantially in lateral alinement with said drive wheels both between the same and laterally outwardly thereof, each of said planter units comprising seed feeding means, and power take-off means driven by the engine of the tractor and connected to drive said seed feeding means.

34. The combination with a tractor having drive wheels, of a planting implement connected to said tractor, comprising a frame, a plurality of planter units mounted on said frame and disposed between and on the outer sides of said drive wheels, each of said planter units comprising seed feeding means, an operating shaft extending transversely of said frame and having operative connection with each of said feeding means, and power take-off means driven by the engine of the tractor and operatively connected to drive said operating shaft.

35. The combination with a tractor having drive wheels, of a planting implement connected to said tractor comprising a frame, a plurality of planter units pivotally connected to one end of said frame and disposed substantially in lateral alinement with said drive wheels, each of said planter units comprising seed feeding means, a feed shaft extending transversely of said frame adjacent to the end to which said planter units are pivotally connected, and power take-off mechanism driven by the engine of the tractor and operatively connected to drive said feed shaft.

36. A power operated planting implement comprising a frame, a plurality of planter units mounted on said frame, a marker arm pivotally supported on said frame for lateral swinging movement between operative and inoperative positions, a power operated member for raising said planter units, means actuated by said power operated member for swinging said marker arm into its inoperative position substantially concurrent with the raising of said planter units.

37. A power operated planting implement comprising a frame, a plurality of planter units movably supported on said frame, a marker arm pivotally supported at each side of said frame for lateral swinging movement between operative and inoperative positions, a power operated shaft extending transversely of said frame, means on said shaft operatively connected to raise said planter units, and means mounted on said shaft for raising either or both of said marker arms.

38. The combination with a tractor having a power take-off shaft driven by the engine of the tractor, of a planting implement comprising a frame adapted to be connected to the tractor, a plurality of planter units mounted on said frame, each of said planter units comprising seed feeding mechanism, a marker arm pivotally supported on said frame, power driven mechanism for raising said planter units, power driven mechanism for driving said seed feeding mechanisms, power driven mechanism for raising said marker arm, and means for operatively connecting all three of said power driven mechanisms to said power take-off shaft to derive their operating energy therefrom.

39. The combination with a tractor having a power take-off shaft driven by the engine of the tractor, a planting implement comprising a frame adapted to be attached to and detached from said tractor, a plurality of planter units pivotally supported on said frame for independent vertical movement relative to said frame, each of said planter units comprising seed feeding mechanism, a pair of marker arms pivotally supported on said frame, a check wire reel mounted on said frame, power driven means for raising said planter units to their transport positions, power driven means for driving said seed feeding mechanisms, power driven means for raising said marker arms, power driven means for driving said check wire reel, and mechanism operatively connecting all four of said power driven means to said power take-off shaft to derive their operating energy therefrom.

40. The combination with a tractor having a power take-off shaft, of a planting implement comprising a frame adapted to be connected to said tractor, a plurality of planter units pivotally supported on said frame, each of said units comprising seed feeding means and seed dropping valve mechanism, a rock shaft operatively connected to lift said planter units to their transport positions, a lift clutch mounted on said frame and comprising driving and driven clutch elements, means for engaging said clutch elements for causing rotation of said driven clutch element thru a half revolution, tripping means for engaging and releasing said latter means, power transmission mechanism connecting said power take-off shaft with said driven clutch element, said power transmission mechanism comprising a worm and worm wheel, a crank rotating with said driven clutch element, and means operatively connecting said crank to said rock shaft.

41. The combination with a tractor having a drive wheel, of a planting implement connected to said tractor and having planter units each comprising a seed dropping mechanism, said seed dropping mechanism being disposed at opposite sides of said drive wheel and immediately adjacent the sides thereof.

42. The combination with a tractor having drive wheels, of a planting implement connected to said tractor and having planter units each comprising a seed dropping mechanism, said seed dropping mechanisms being substantially in lateral alignment with said drive wheels and disposed both between said wheels and beyond the laterally outward sides thereof.

43. The combination with a tractor having drive wheels, of a planting implement connected to said tractor and having a plurality of planter units each comprising a seed dropping mechanism, said seed dropping mechanisms being positioned substantially in the vertical axial plane of the drive wheels, and disposed transversely of the tractor both between said wheels and beyond the laterally outward sides thereof.

44. The combination with a tractor having front and rear wheels, of a planting implement comprising a frame adapted to have one end thereof attached to and detached from said tractor in transverse relation thereto and at a point between said front and rear wheels, said frame being adapted for one set of tractor wheels to be driven thereover during attachment to or detachment from said tractor, to place the frame in attaching relation to the latter or to free the frame therefrom, a plurality of planter units mounted on said frame and disposed in spaced relation laterally thereof to be out of the path of travel of the tractor wheels when driven over said frame, and an operating means for said planter units extending substantially transversely of said frame and having at least a portion arranged to be removed from the path of the tractor wheels when said wheels are to be driven over the frame.

45. The combination with a tractor having front and rear wheels, of a planting implement comprising a frame adapted to have one end thereof attached to and detached from said tractor in transverse relation thereto and at a point between said front and rear wheels, said frame being adapted to receive one set of tractor wheels when driven thereover to place the frame in attaching relation to the tractor or to free the frame therefrom, a plurality of planter units mounted on said frame and disposed in spaced relation laterally thereof to be out of the path of travel of the tractor wheels when driven over said frame, and an operating shaft extending transversely of said frame and having operative connection with said planter units, said operating shaft being mounted on said frame and adapted to be moved out of the path of the tractor wheels when the wheels are driven over the frame.

46. The combination with a tractor having front and rear wheels, of a planting implement comprising a frame adapted to have one end thereof attached to and detached from said tractor in transverse relation thereto and at a point between said front and rear wheels, said frame being adapted to have one set of tractor wheels driven thereover during attachment to or detachment from the tractor, a plurality of planter units mounted on said frame and disposed in spaced relation laterally thereof to be out of the path of travel of the tractor wheels when driving over said frame, and having means operatively connected with said planter units, said means including a plurality of shaft sections mounted on said frame so as to be capable of outward shifting movement, whereby said shaft sections may be withdrawn from the path of the tractor wheels when said wheels are to be driven over the frame.

47. A power operated planting implement comprising a frame, a plurality of planter units mounted on said frame, a pair of independently operable marker arms pivotally supported on opposite sides of said frame for lateral swinging movement between operative and inoperative positions, a power driven operating member for raising said planter units, and means actuated by said power driven operating member for swinging either or both marker arms from operative position into inoperative position substantially concurrent with the raising of said planter units.

CHARLES H. WHITE.